(12) United States Patent
Kim

(10) Patent No.: US 9,499,186 B1
(45) Date of Patent: Nov. 22, 2016

(54) PALLET TRANSFER APPARATUS WITH HANDLE PULLING TYPE FOLDING STRUCTURE

(71) Applicant: Jin Ok Kim, Seoul (KR)

(72) Inventor: Jin Ok Kim, Seoul (KR)

(*) Notice: Subject to any disclaimer, the term of this patent is extended or adjusted under 35 U.S.C. 154(b) by 0 days.

(21) Appl. No.: 14/934,958

(22) Filed: Nov. 6, 2015

(51) Int. Cl.
*B62B 1/00* (2006.01)
*B62B 3/02* (2006.01)

(52) U.S. Cl.
CPC ....................... *B62B 3/02* (2013.01)

(58) Field of Classification Search
CPC .......... B62B 1/00; B62B 1/02; B62B 1/008; B62B 1/04
See application file for complete search history.

(56) References Cited

U.S. PATENT DOCUMENTS

| | | | | |
|---|---|---|---|---|
| 5,779,252 A * | 7/1998 | Bolton, Jr. | ................ | B62B 3/02 280/35 |
| 6,196,560 B1 * | 3/2001 | Ohlsson | .................... | B62B 1/12 182/20 |
| 7,600,765 B2 * | 10/2009 | Tsai | ........................ | B62B 1/002 280/47.18 |
| 7,784,816 B2 * | 8/2010 | Jian | .......................... | B62B 3/02 280/38 |
| 8,979,098 B2 * | 3/2015 | Wang | ...................... | B62B 3/022 280/39 |
| 2004/0256818 A1 * | 12/2004 | Amsili | .................... | B62B 1/002 280/47.29 |
| 2005/0006877 A1 * | 1/2005 | Kachkovsky | ........... | B62B 3/027 280/641 |
| 2012/0211970 A1 * | 8/2012 | Saito | ...................... | B62B 5/067 280/651 |

FOREIGN PATENT DOCUMENTS

KR  1020130061927  6/2013

* cited by examiner

*Primary Examiner* — Hau Phan
(74) *Attorney, Agent, or Firm* — IPLA P.A.; James E. Bame

(57) ABSTRACT

A pallet transfer apparatus with a handle pulling type folding structure includes a moving body unit which includes a pair of deformed fitting type horizontal support units which are arranged parallel at regular intervals and is configured to move by loading a pallet on a pair of the horizontal support units; a height adjusting body unit which includes a pair of vertical support units which are connected in a vertical direction from each of a pair of the horizontal support units, wherein the heights of the vertical support units can be adjusted; and a folding adjusting unit which includes a horizontal bar-shaped handle connected to the top of each of a pair of the vertical support units.

11 Claims, 5 Drawing Sheets

100

PALLET TRANSFER APPARATUS WITH HANDLE PULLING TYPE FOLDING STRUCTURE

BACKGROUND

The present invention relates to a pallet transfer apparatus with handle pulling type folding structure, and in particular to a pallet transfer apparatus with a handle pulling type folding structure wherein the height of a bar-shaped handle may be adjusted, and a locked state of a pallet transfer apparatus can be unlocked in cooperation with a pulling operation, thus folding and transferring or storing when it is not used.

A pallet represents a support which is configured to transfer, load or store freight in a warehouse, a factory, etc. This pallet is made of a board the upper and lower sides of which are flat. A lot of freights may be loaded on the upper side, thus transferring a lot of freights at a time. The pallet may be used for the purpose of transferring and storing freights when managing goods.

This pallet is configured in such a way that a fork of a forklift truck can be inserted through a side of the pallet, so the pallet can be easily lifted and moved using the forklift truck. Such a pallet can be moved by a worker's manual work. For this, various hand pallet transfer apparatuses are being used. In case of a known hand pallet transfer apparatus, it has a volume corresponding to a plane shape and size of the pallet. When the hand pallet transfer apparatus is not used, a lot of spaces is necessary because of a large volume, thus causing inconvenience.

For this reason, the pallet transfer apparatus may be used for the occasions where it is used and it is not used. It needs to develop a new pallet transfer apparatus having a folding structure which can be folded, transferred and stored through a simplified and easy operation if it is not used for the purpose of transfer of a pallet.

As a prior art in relation with the present invention, there is Korean patent publication number 2013-0061927 (Jun. 12, 2013) which describes a technology on a folding type cart.

SUMMARY OF THE INVENTION

Accordingly, it is an object of the present invention to provide a pallet transfer apparatus with a handle pulling type folding structure wherein the height of a bar-shaped handle may be adjusted, and a locked state of a pallet transfer apparatus can be unlocked in cooperation with a pulling operation, thus folding and transferring or storing when it is not used.

It is noted that the objects to be solved by the present invention are not limited to the above-mentioned object. Other objects may be clearly understood by a person having ordinary skill in the art with the aid of the descriptions below.

To achieve the above objects, according to one aspect of the present invention, there is provided a pallet transfer apparatus with a handle pulling type folding structure, which may include, but is not limited to, a moving body unit which includes a pair of deformed fitting type horizontal support units which are arranged parallel at regular intervals and is configured to move by loading a pallet on a pair of the horizontal support units; a height adjusting body unit which includes a pair of vertical support units which are connected in a vertical direction from each of a pair of the horizontal support units, wherein the heights of the vertical support units can be adjusted; and a folding adjusting unit which includes a horizontal bar-shaped handle connected to the top of each of a pair of the vertical support units and is configured to unlock the locked states of a pair of the horizontal support units and a pair of the vertical support units when the handle is pulled, wherein the folding adjusting unit may include, but is not limited to, a support frame which is formed at a lower side of the handle; an elastic member which is provided at the support frame; and a movable frame which is arranged spaced apart from the support frame with the elastic member being disposed between the movable frame and the support frame.

The moving body unit may include a connection bar which is configured to connect a pair of the horizontal support units, and both ends of the connection bar are inserted rotatable into an end of one side of each of a pair of the horizontal support units.

The moving body unit may include wheels which are disposed toward the ground from each of a pair of horizontal support units; and side wheels which are protruding toward an outer side of each of a pair of the horizontal support units and are configured to be rotatable on the ground when the locked states of a pair of the horizontal support units and a pair of the vertical support units are unlocked by the pulling operation of the handle.

The wheels and side wheels are provided at least two or more in number in the longitudinal directions of a pair of the horizontal support units, and the wheels and side wheels are alternately arranged crossing each other.

The height adjusting body unit includes a pair of insertion support units which are fixed vertical from each of a pair of the horizontal support units in the installation direction of each of a pair of the vertical support units, and a pair of the insertion support units may be sized large enough to be inserted into the insides of a pair of the vertical support units.

The height adjusting body unit may include at least one fixture so as to adjust a connection height between a pair of the insertion support units and a pair of the vertical support units, and a spring type elastic member which is configured to connect the support frame and the movable frame.

The movable frame may include a pair of connection grooves configured to fix the connection end portions formed on the tops of a pair of the vertical support units.

The movable frame may extend the elastic member when the handle is pulled, and may move in a direction close to the support frame, and when the pulled handle is released, the movable frame may move in a direction where it is spaced apart from the support frame by means of a recovery force of the elastic member, whereupon the locking and unlocking between the connection grooves and the connection end portions can be controlled in accordance with the pulling operation of the handle.

A plurality of circular protrusion pieces are protruding at regular intervals from a lower side of the support frame, and a plurality of semicircular receiving grooves into which a plurality of the circular protruding pieces are inserted and held are provided on the top of the movable frame.

In a pallet transfer apparatus with a handle pulling type folding structure according to an exemplary embodiment of the present invention, the height of a bar-shaped handle may be adjusted, and a locked state of a pallet transfer apparatus can be unlocked in cooperation with a pulling operation, thus folding and transferring or storing when it is not used.

In addition, the present invention may be used for the purpose of in general transferring a wooden pallet and a plastic pellet and may be used as a cart in such a way to install a shelf on a horizontal support target surface.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

The advantages and features of the present invention and method for achieving them will be made clear with reference to the embodiments below together with the accompanying drawings. The present invention is not limited to the embodiments which will be described below and may be implemented in various types. The exemplary embodiments of the present invention are provided so that a person having ordinary skill in the art to know a scope of the present invention. The present invention may be defined by a scope of the claims, and the same reference numbers represent the same components throughout the specification.

In the course of the descriptions on the exemplary embodiments of the present invention, if it is determined that the detailed descriptions on the known function or configuration might make the subject matters of the present invention unclear, the detailed descriptions thereon may be omitted. The terms which will be described below have been defined in consideration of the functions of the exemplary embodiments of the present invention, the definitions of which may change based on the intention or practice of a user or an operator, so their definitions should be determined based on the contents throughout the specification.

The pallet transfer apparatus with a handle pulling type folding structure according to the present invention will be described with reference to the accompanying drawings.

Figure 1:
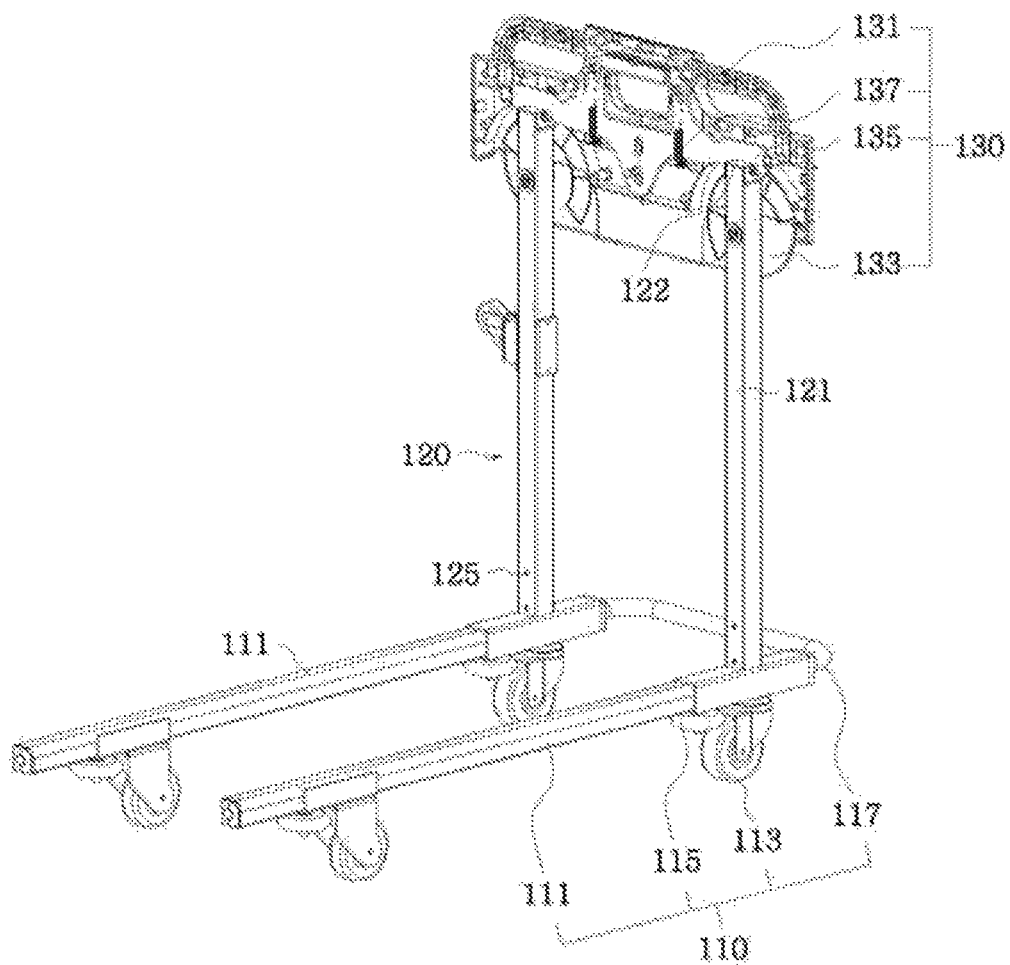
FIG. 1 is a detailed perspective view illustrating a pallet transfer apparatus with a handle pulling type folding structure according to an exemplary embodiment of the present invention.
Figure 2:
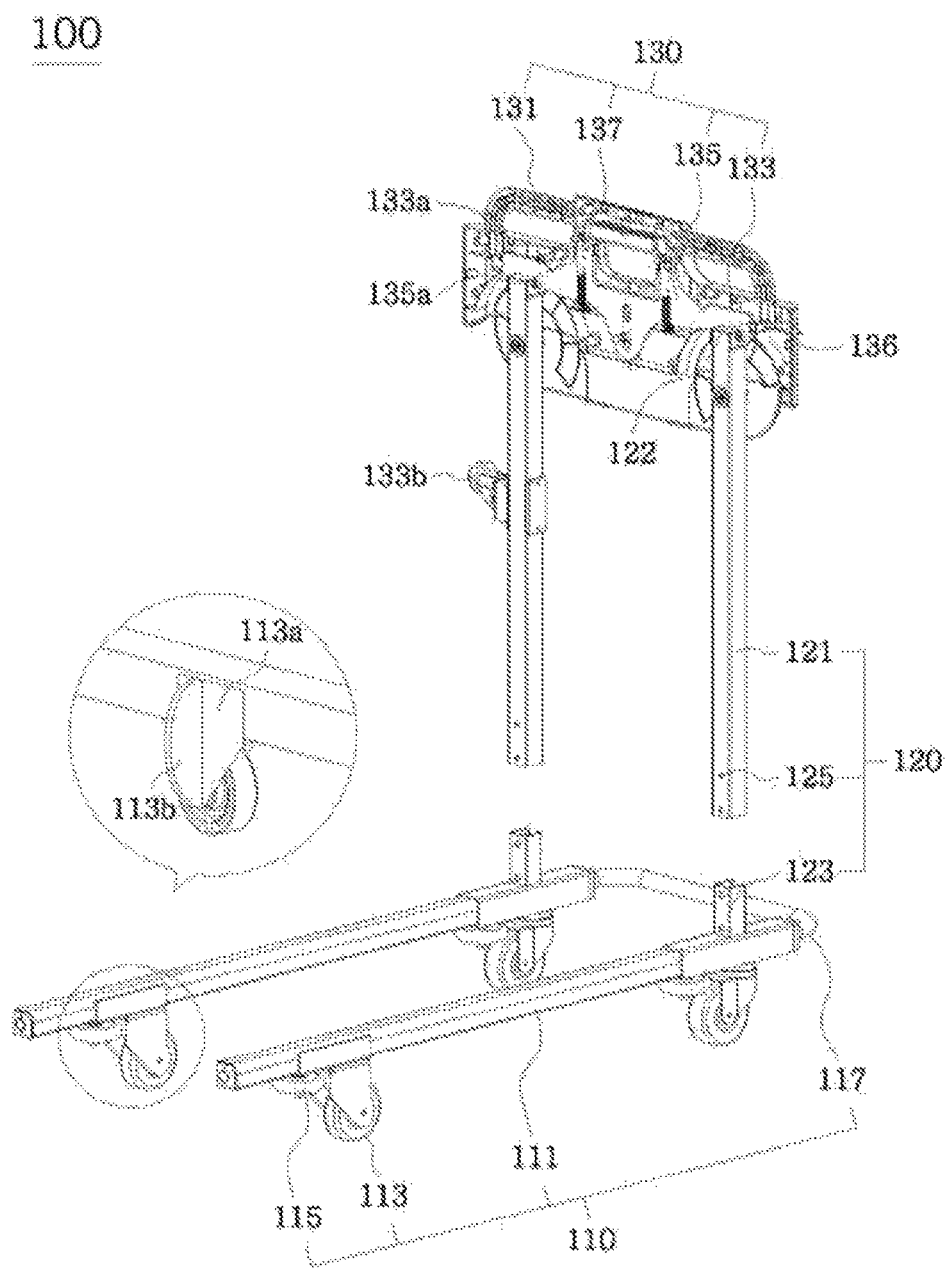
FIG. 2 is a detailed disassembled view illustrating a pallet transfer apparatus with a handle pulling type folding structure according to an exemplary embodiment of the present invention.
Figure 3:
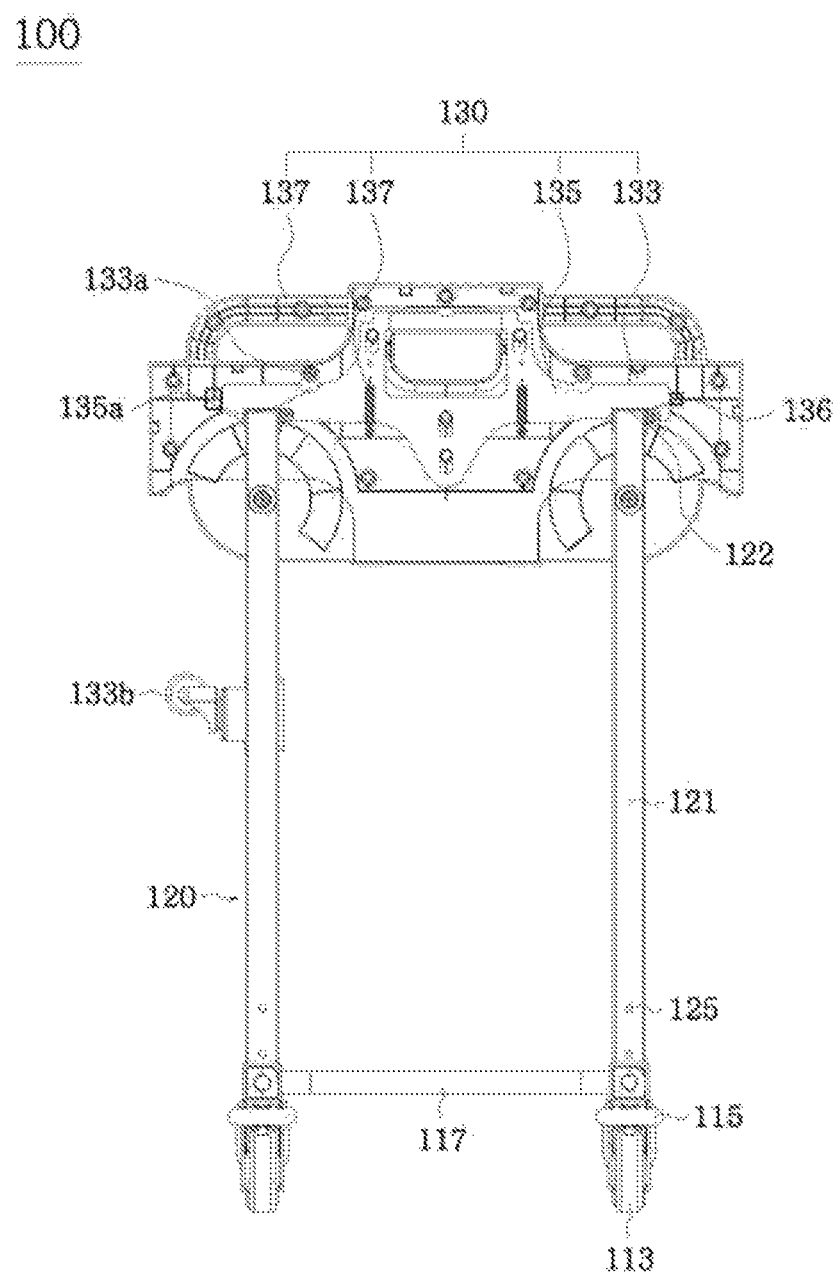
FIG. 3 is a detailed front view illustrating a pallet transfer apparatus with a handle pulling type folding structure according to an exemplary embodiment of the present invention.
Figure 4:
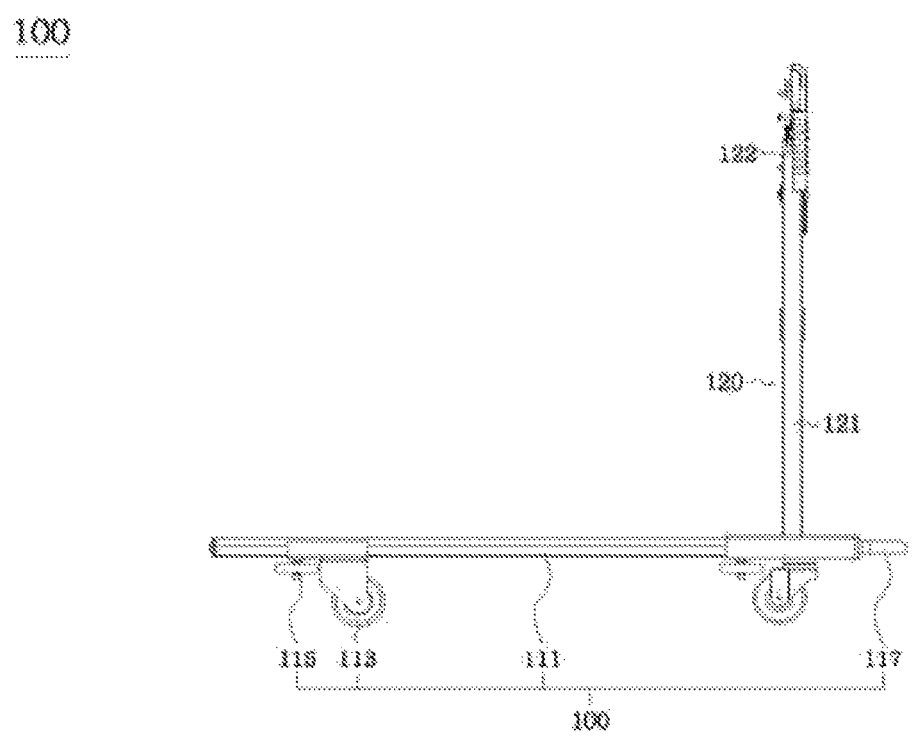
FIG. 4 is a side view illustrating a pallet transfer apparatus with a handle pulling type folding structure according to an exemplary embodiment of the present invention.

Referring to FIGS. 1 to 3, the pallet transfer apparatus (hereinafter referred to as "pallet transfer apparatus") with a handle pulling type folding structure may include, but is not limited to, a moving body unit 110, a height adjusting body unit 120, and a folding adjusting unit 130.

The moving body unit 110 may include a pair of horizontal support units 111 which are arranged parallel at regular intervals, and a pallet (not illustrated) is loaded onto a pair of the horizontal support units 111.

For this, the moving body unit 110 may include wheels 113 which are protruding toward the ground (namely, bottom surface) from each of a pair of deformed fitting type horizontal support units 111.

The wheels 113 may be provided multiple in number, and the kinds and types of the wheels 113 are not limited.

In addition, the moving body unit 110 may include side wheels 115 which are protruding toward a side surface, namely, in an outward direction from each of a pair of the horizontal support units 111.

The side wheels 115 may be arranged rotatable on the ground if the locked states of a pair of the horizontal support units and a pair of the vertical support units are unlocked by a pulling operation of the handle, namely, in a state where the pallet transfer apparatus 100 is folded. More specifically, if the pallet transfer apparatus 100 loads and moves a pallet while maintaining a desired shape, it may be configured movable by the rotations of the wheels 113, and in a state that the pallet transfer apparatus 110 is folded, the side wheels 115 are provided facing the ground, whereupon it can move by the rotations of the side wheels 115.

The side wheels 115 may be provided multiple in number, and the kinds and types of the side wheels 115 are not limited. For example, at least two or more wheels 113 and at least two or more side wheels 115 may be arranged at regular intervals in the longitudinal directions of a pair of the horizontal support units 111. In a more preferred exemplary embodiment, the wheels 113 and the side wheels 115 may be alternately arranged crossing each other. A vertical reinforcing plate 113a may be attached to both side surfaces of each of the wheels 113 so as to integrate a rotary shaft of each wheel with the horizontal support unit, and a semicircular plate 113b is attached orthogonal to one side of the vertical reinforcing plate. In this state, if the horizontal support unit is inserted into the pallet, and the pallet is lifted up, the weight of the product which applies to the wheels can be stably supported. This support may be performed with the semicircular plate contacting with the ground, whereupon the pallet can be easily lifted up.

The lengths, cross sections and shapes of a pair of the horizontal support units 111 may be variously changed based on the size, shape and configuration of the pallet which is loaded on the top. For example, a rod steel with a quadrangular cross section may be used.

Meanwhile, the moving body unit 110 may include a connection bar 117 which is configured to connect a pair of the horizontal support units 111.

The connection bar 117 is connected to an end portion of one side of each of the horizontal support units 111 and is a member configured to connect them while crossing a direction where a pair of the horizontal support units 111 are arranged parallel with each other. For example, an end portion of each of both sides of the connection bar 117 may be inserted through an end portion of one side of each of a pair of the horizontal support units 111. It is preferred that an insertion portion is configured in a rotatable link type.

The height adjusting body unit 120 may include a pair of vertical support units 121 which are connected vertical from each of a pair of the horizontal support units 111, wherein the heights of the vertical support unit 121 can be adjusted. The height adjusting body unit 120 may have a function wherein a user can adjust a pair of the vertical support units 121 to a desired height. To this end, the height of the handle 131 can be adjusted, thus enhancing convenience when in use.

For this, the height adjusting body unit 120 may include a pair of insertion support units (123 in FIGS. 2 and 3) which are fixed vertical from each of a pair of the horizontal support units 111 in the installation directions of a pair of the vertical support units 121. As illustrated in FIG. 2, a pair of the insertion support units may be formed large enough to be inserted into the inner side of each of a pair of the vertical support units.

In addition, the height adjusting body unit 120 may include at least one or more fixtures 125 which may allow to adjust a connection height between a pair of the insertion support units 123 and a pair of the vertical support units 121. The fixtures 125 may be configured to fix the adjusted height after the connection height between a pair of the insertion support units 123 and a pair of the vertical support units 121 has been adjusted. For example, a configuration formed of a fixing hole and a fixing pin engaged thereto may be used. The longitudinal flexibility of the height adjusting body unit 120 can be adjusted in such a way to change and then lock the connection portion between a pair of the insertion support unit 123 and a pair of the vertical support units 121.

The folding adjusting unit 130 may include a horizontal bar-shaped handle 131 which is connected to the tops of a pair of the vertical support units 121. The locked states of a pair of the horizontal support units 111 and a pair of the vertical support units 121 may be unlocked in such a way to pull the handle 131 (namely, by pulling the handle upward). The pallet transfer apparatus 100 can be folded in the above way, whereupon when the pallet transfer apparatus 100 is not used for transfer, it can be folded and stored or transferred.

For this, the folding adjusting unit 130 may include, but is not limited to, a handle 131, a support frame 133, a movable frame 135 and an elastic member 137.

The handle 131 represents a horizontal bar-shaped handle. The position, namely, the height of the handle 131 may be adjusted for a user's convenience since the height of the vertical support unit 121 can be adjusted.

The support frame 133 may be disposed at a lower side of the handle 131. The elastic member 137 may be fixedly hooked by an end portion of the support frame 133.

The movable frame 135 may be connected to the handle 131 and may be arranged parallel at a predetermined interval with the support frame 133 with the elastic member 137 being disposed between the movable frame 135 and the movable frame 135.

If the user does not pull the handle 131, the movable frame 135 may position spaced apart from the support frame with the aid of an elastic recovery operation of the elastic member 137.

The movable frame 135 may include a pair of connection grooves (reference number 136 in FIG. 2) so as to fixedly insert a connection end portion (reference number 122 in FIG. 2) formed on the tops of a pair of the vertical support units 121.

The movable frame 135 may equip with a function to stably keep the shape when the vertical support unit 121 is being used.

For example, when the handle 131 is pulled, the movable frame 135 may extend the elastic member 137 and may move in the direction where the movable frame 135 approaches the top of the support frame 133. On the contrary, when the pulled state of the handle 131 is released, the movable frame 135 may move in the direction where it is spaced apart from the support frame 133 with the aid of recovery force of the elastic member 137.

Since the locking and unlocking between the connection grooves 126 provided at the movable frame and the connection end portions 122 formed on the tops of a pair of the vertical support units 121 can be controlled by pulling or releasing the handle 131, the folding operation of the pallet transfer apparatus 100 can be obtained.

A plurality of circular protrusion pieces 133a may be formed protruding from the lower side of the support frame 133 at regular intervals, and a plurality of semicircular receiving grooves 135a may be formed corresponding thereto on the top of the movable frame 135, the circular protrusion pieces 13a being inserted into a plurality of the semicircular receiving grooves 135a.

Figure 5:
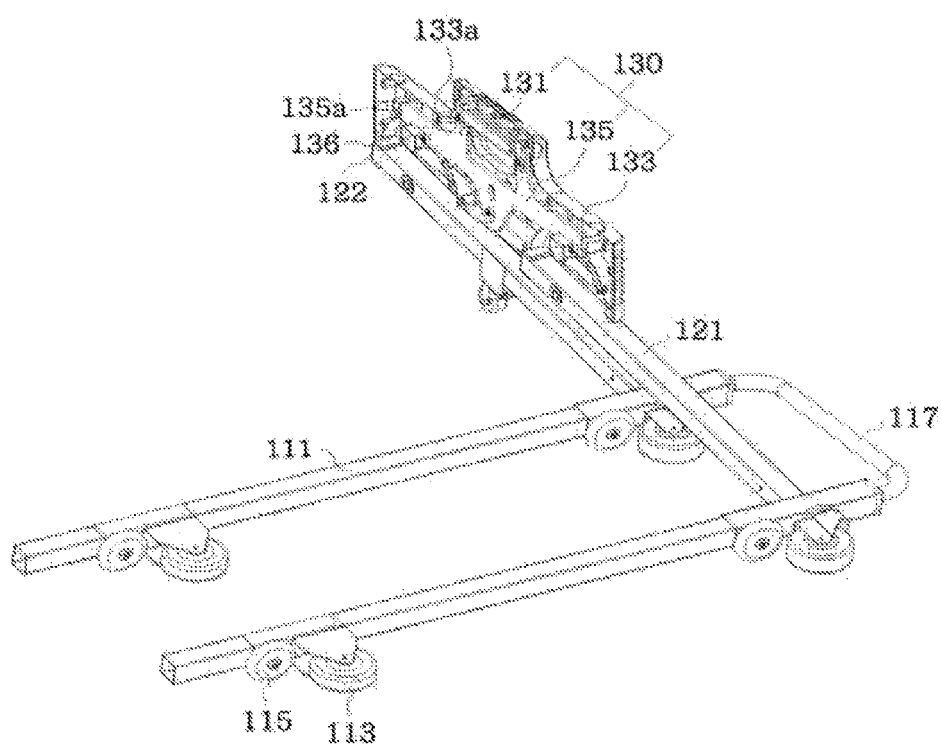
FIG. 5 is a view illustrating an operation state which sequentially shows the folding of a pallet transfer apparatus with a handle pulling type folding structure according to an exemplary embodiment of the present invention.

FIG. 5 is a view illustrating an operation state which sequentially shows the folding of a pallet transfer apparatus with a handle pulling type folding structure according to an exemplary embodiment of the present invention.

Referring to FIG. 5, it shows that when the apparatus is not used for transfer work of the palette, the pallet transfer apparatus is folded by pulling the handle 131.

First, when the handle 131 is pulled in a set upward direction, the movable frame 135 may allow to extend the spring type elastic member 137 in cooperation with the direction of the pulling operation of the handle 131 and may move in the direction where it approaches the support frame 133. As illustrated in FIG. 5, a guide wheel is installed at one side of the vertical support unit. When the palette transfer apparatus is folded and inserted into the palette as illustrated in FIG. 5, the angle when the palette is loaded can be constantly maintained using the guide wheel 133b, namely, the work height of the palette transfer apparatus can be maintained constant. A pair of the connection grooves 136 formed at the lower side of the movable frame 135 may separate from a pair of the connection end portions 122 formed on the tops of a pair of the vertical support units 121 in cooperation with the pulling operation of the handle 131. As a result, the height adjusting body unit 120 and the moving body unit 110 connected thereto are unlocked from the folding adjusting unit 130 which includes the handle 131. More specifically, the pallet transfer apparatus can be freely folded in the direction "R" with the aid of the connection bar 117 which is connected movable between a pair of the horizontal support units 111, and the moving body unit 110 and the height adjusting body unit 120 are unlocked from the folding adjusting unit 130, whereupon the whole shape of the pallet transfer apparatus can look like a foldable structure. In this way, the pallet transfer apparatus 100 according to an exemplary embodiment of the present invention can be made into a structure wherein it is easily folded and stored by pulling the handle.

As described above, according to the configuration and operation of the present invention, the height of the horizontal bar-shaped handle can be adjusted, and the locked state of the palette transfer apparatus can be unlocked in cooperation with the pulling operation and can be folded and stored or transferred when it is not used. Since the palette transfer apparatus can be folded and stored with a simple and easier operation, a large space is not necessary for storing, whereupon a space efficiency can be maximized.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A pallet transfer apparatus with a handle pulling type folding structure, comprising:

a moving body unit which includes a pair of horizontal support units which are arranged parallel at regular intervals and is configured to move by loading a pallet on the horizontal support units;

a height adjusting body unit which includes a pair of vertical support units which are connected in a vertical direction from each of the horizontal support units, wherein the heights of the vertical support units can be adjusted; and a folding adjusting unit which includes a horizontal bar-shaped handle connected to the top of each of the vertical support units and is configured to unlock the locked states of the horizontal support units and the vertical support units when the handle is pulled, wherein the folding adjusting unit includes:

a support frame which is formed at a lower side of the handle;

an elastic member which is provided at the support frame; and a movable frame which is arranged spaced apart from the support frame with the elastic member being disposed between the movable frame and the support frame.

2. The apparatus of claim 1, wherein the moving body unit includes a connection bar which is configured to connect the horizontal support units, and both ends of the connection bar are inserted rotatable into an end of one side of each of the horizontal support units.

3. The apparatus of claim 1, wherein the moving body unit includes:

wheels which are disposed toward the ground from each of horizontal support units; and side wheels which are protruding toward an outer side of each of the horizontal support units and are configured to be rotatable on the ground when the locked states of the horizontal support units and the vertical support units are unlocked by the pulling operation of the handle.

4. The apparatus of claim 3, wherein the wheels and side wheels are provided at least two or more in number in the longitudinal directions of the horizontal support units, and the wheels and side wheels are alternately arranged crossing each other.

5. The apparatus of claim 1, wherein the height adjusting body unit includes a pair of insertion support units which are fixed vertical from each of the horizontal support units in the installation direction of each of the vertical support units.

6. The apparatus of claim 5, wherein the height adjusting body unit includes at least one fixture so as to adjust a connection height between the insertion support units and the vertical support units.

7. The apparatus of claim 1, wherein the movable frame includes a pair of connection grooves configured to fix the connection end portions formed on the tops of the vertical support units.

8. The apparatus of claim 7, wherein the movable frame extends the elastic member when the handle is pulled, and moves in a direction close to the support frame, and when the pulled handle is released, the movable frame moves in a direction where it is spaced apart from the support frame by means of a recovery force of the elastic member, whereupon the locking and unlocking between the connection grooves and the connection end portions can be controlled in accordance with the pulling operation of the handle.

9. The apparatus of claim 1, wherein a plurality of circular protrusion pieces are protruding at regular intervals from a lower side of the support frame, and a plurality of semicircular receiving grooves into which a plurality of the circular protruding pieces are inserted and held are provided on the top of the movable frame.

10. The apparatus of claim 1, further comprising:

a vertical reinforcing plate which is installed at both sides of each wheel; and a semicircular plate which is installed orthogonal to the vertical reinforcing plate at one side of the vertical reinforcing plate.

11. The apparatus of claim 1, further comprising:

a guide wheel installed at one side of the vertical support unit.

* * * * *